(12) United States Patent
Kimura et al.

(10) Patent No.: US 9,542,734 B2
(45) Date of Patent: Jan. 10, 2017

(54) INFORMATION PROCESSING APPARATUS, IMAGE PROCESSING METHOD, AND STORAGE MEDIUM THAT DETERMINE TONE CHARACTERISTICS FOR RESPECTIVE OBJECT SIGNALS

(71) Applicant: CANON KABUSHIKI KAISHA, Tokyo (JP)

(72) Inventors: Naoto Kimura, Yokohama (JP); Shota Yamaguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/516,752

(22) Filed: Oct. 17, 2014

(65) Prior Publication Data
US 2015/0109525 A1    Apr. 23, 2015

(30) Foreign Application Priority Data

Oct. 23, 2013 (JP) .................................. 2013-220482

(51) Int. Cl.
*G06T 5/40* (2006.01)
*H04N 9/04* (2006.01)
(Continued)

(52) U.S. Cl.
CPC .................. *G06T 5/40* (2013.01); *G06T 5/008* (2013.01); *H04N 1/40062* (2013.01);
(Continued)

(58) Field of Classification Search
CPC .. G06T 5/40; G06T 5/008; G06T 2207/20208; H04N 1/4074; H04N 1/40062; H04N 5/20; H04N 9/045
(Continued)

(56) References Cited

U.S. PATENT DOCUMENTS 8,355,059 B2    1/2013  Fukui
2007/0177050 A1*  8/2007  Xiao .................. H04N 5/23219
                                                                  348/371

(Continued)

FOREIGN PATENT DOCUMENTS

JP    2006-039666 A    2/2006
JP    2010130150 A    6/2010
JP    2010-193099 A    9/2010

*Primary Examiner* — Gevell Selby
(74) *Attorney, Agent, or Firm* — Fitzpatrick, Cella, Harper & Scinto

(57) ABSTRACT

An image processing apparatus includes an acquisition unit to acquire an image. A detection unit detects each object region from the image acquired by the acquisition unit. A luminance distribution calculation unit calculate a plurality of luminance distribution information for respective object regions detected by the detection unit. A representative luminance value calculation unit calculates a plurality of representative luminance values for respective detected object regions. A determination unit determines tone characteristics for respective object regions based on the plurality of luminance distribution information for respective object regions calculated by the luminance distribution calculation unit and a relationship among the representative luminance values for the respective object regions calculated by the representative luminance value calculation unit.

10 Claims, 17 Drawing Sheets

(51) Int. Cl.
*G06T 5/00* (2006.01)
*H04N 5/20* (2006.01)
*H04N 1/40* (2006.01)
*H04N 1/407* (2006.01)

(52) U.S. Cl.
CPC ............ *H04N 1/4074* (2013.01); *H04N 5/20* (2013.01); *H04N 9/045* (2013.01); *G06T 2207/20208* (2013.01)

(58) Field of Classification Search
USPC ....................................................... 348/254
See application file for complete search history.

(56) References Cited

U.S. PATENT DOCUMENTS

| | | | |
|---|---|---|---|
| 2008/0187235 A1* | 8/2008 | Wakazono | H04N 5/243 348/296 |
| 2009/0073287 A1* | 3/2009 | Shimizu | H04N 5/23212 348/234 |
| 2010/0201843 A1 | 8/2010 | Fukui | |
| 2012/0314095 A1 | 12/2012 | Fukui | |
| 2012/0314971 A1* | 12/2012 | Yuan | G06T 5/008 382/274 |

\* cited by examiner

FIG. 7A
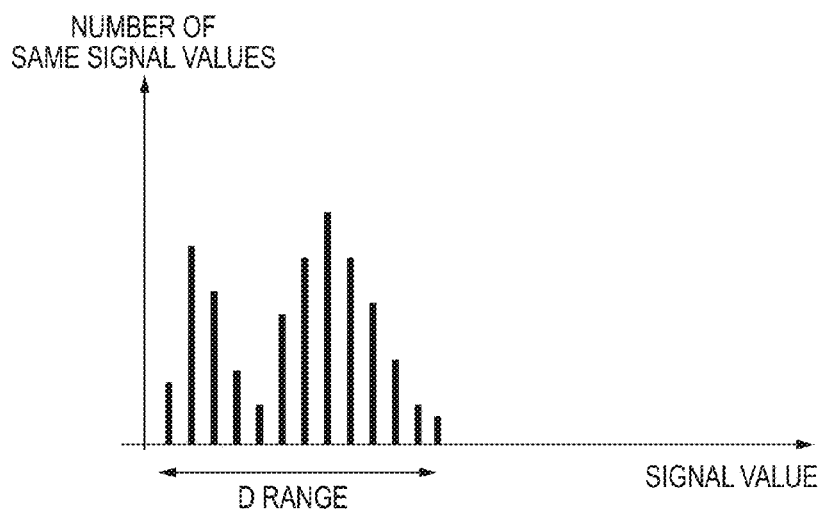
FIG. 7B
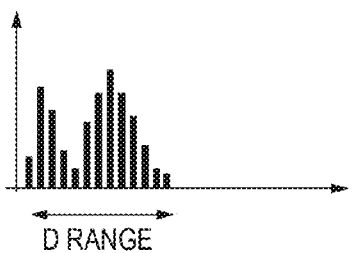
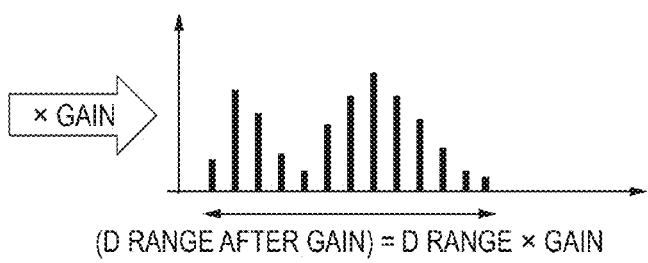

FIG. 10A
HISTOGRAM
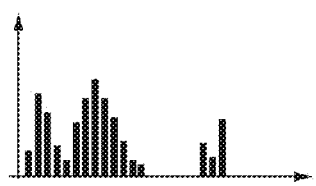
TONE COMPRESSION CHARACTERISTICS
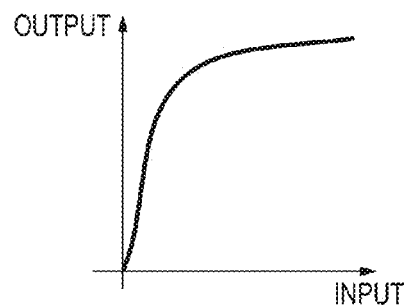
FIG. 10B
HISTOGRAM
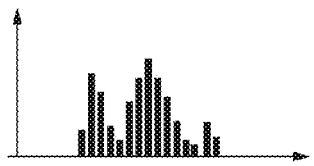
TONE COMPRESSION CHARACTERISTICS
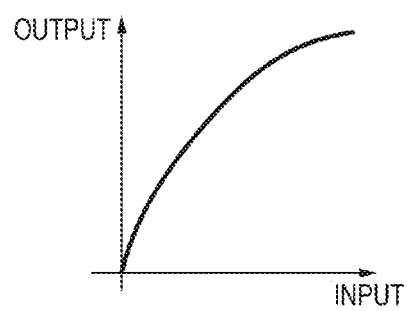
FIG. 10C
HISTOGRAM
TONE COMPRESSION CHARACTERISTICS
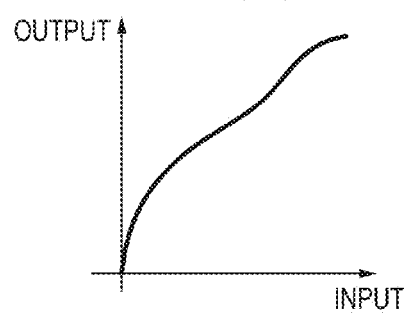

INFORMATION PROCESSING APPARATUS, IMAGE PROCESSING METHOD, AND STORAGE MEDIUM THAT DETERMINE TONE CHARACTERISTICS FOR RESPECTIVE OBJECT SIGNALS

CLAIM OF PRIORITY

This application claims the benefit of Japanese Patent Application No. 2013-220482 filed on Oct. 23, 2013, which is hereby incorporated by reference herein in its entirety.

BACKGROUND OF THE INVENTION

Field of the Invention

The present invention relates to an image processing apparatus that performs tone correction.

Description of the Related Art

Conventionally, as in an HDR (High Dynamic Range) process, a dodging process, or the like, there is known tone correction processing in which a signal obtained by expanding the D range of an input signal is tone-compressed at the stage of outputting the signal.

Japanese Patent Laid-Open No. 2010-130150 has proposed a technique of generating a high-contrast image by dividing an image into a plurality of regions based on edge amounts, calculating histograms in the regions, and converting tone conversion curves in the regions corresponding to the histograms.

According to the technique disclosed in Japanese Patent Laid-Open No. 2010-130150, however, as the D range compression effect increases, the resultant picture looks unnatural, because no consideration is given to the balance among the object regions.

SUMMARY OF THE INVENTION

The present invention has been made in consideration of the above problem and provides the ability to generate an image with less saturated (blown-out highlight) and blocked-up shadow regions, even in a scene in which the D range is wide within the same object region in a frame.

According to a first aspect, the present invention provides an image processing apparatus comprising an acquisition unit configured to acquire an image, a detection unit configured to detect each object region from the image acquired by the acquisition unit, a luminance distribution calculation unit configured to calculate a luminance distribution for each object region detected by the detection unit, a representative luminance value calculation unit configured to calculate a representative luminance value for each object region detected by the detection unit, and a determination unit configured to determine tone characteristics for each object region based on the luminance distribution for each object region calculated by the luminance distribution calculation unit and a relationship among the representative luminance values for the respective object regions calculated by the representative luminance value calculation unit.

According to a second aspect, the present invention provides an image processing method comprising an acquisition step of acquiring an image, a detection step of detecting each object region from the image acquired in the acquisition step, a luminance distribution calculation step of calculating a luminance distribution for each object region detected in the detection step, a representative luminance value calculation step of calculating a representative luminance value for each object region detected in the detection step, and a determination step of determining tone characteristics for each object region based on the luminance distribution for each object region calculated in the luminance distribution calculation step and a relationship among the representative luminance values for the respective object regions calculated in the representative luminance value calculation step.

Further features of the present invention will become apparent from the following description of exemplary embodiments with reference to the attached drawings.

BRIEF DESCRIPTION OF THE DRAWINGS

FIGS. 7A and 7B are graphs for explaining the calculation of a D range using histograms;

FIGS. 10A to 10C are graphs for explaining the relationship between histogram shapes and tone compression characteristics;

DESCRIPTION OF THE EMBODIMENTS

The embodiments of the present invention will be described in detail below with reference to the accompanying drawings.

Figure 17:
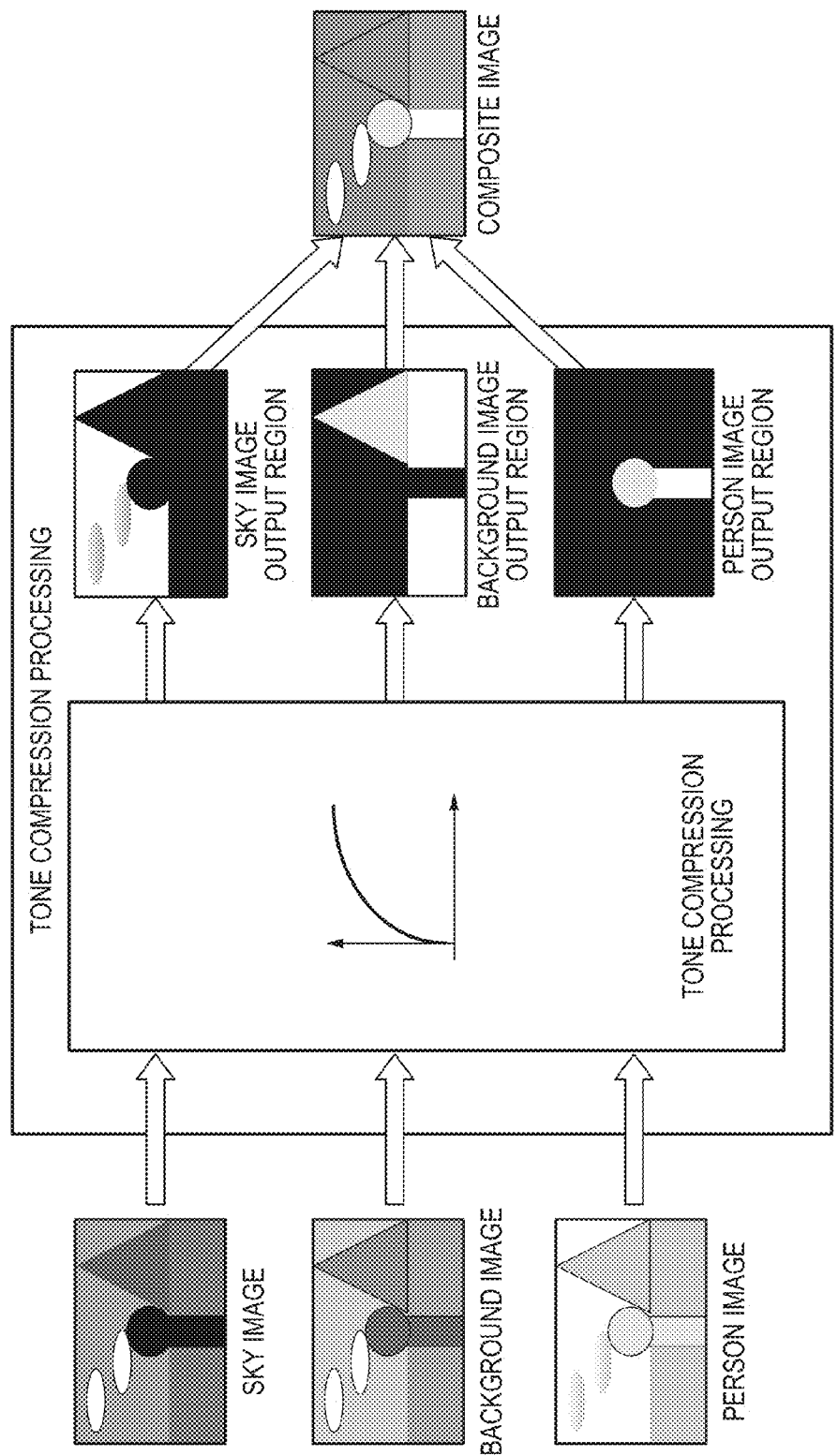
FIG. 17 is a view for explaining region-specific tone correction processing using a plurality of images.
Figure 18:
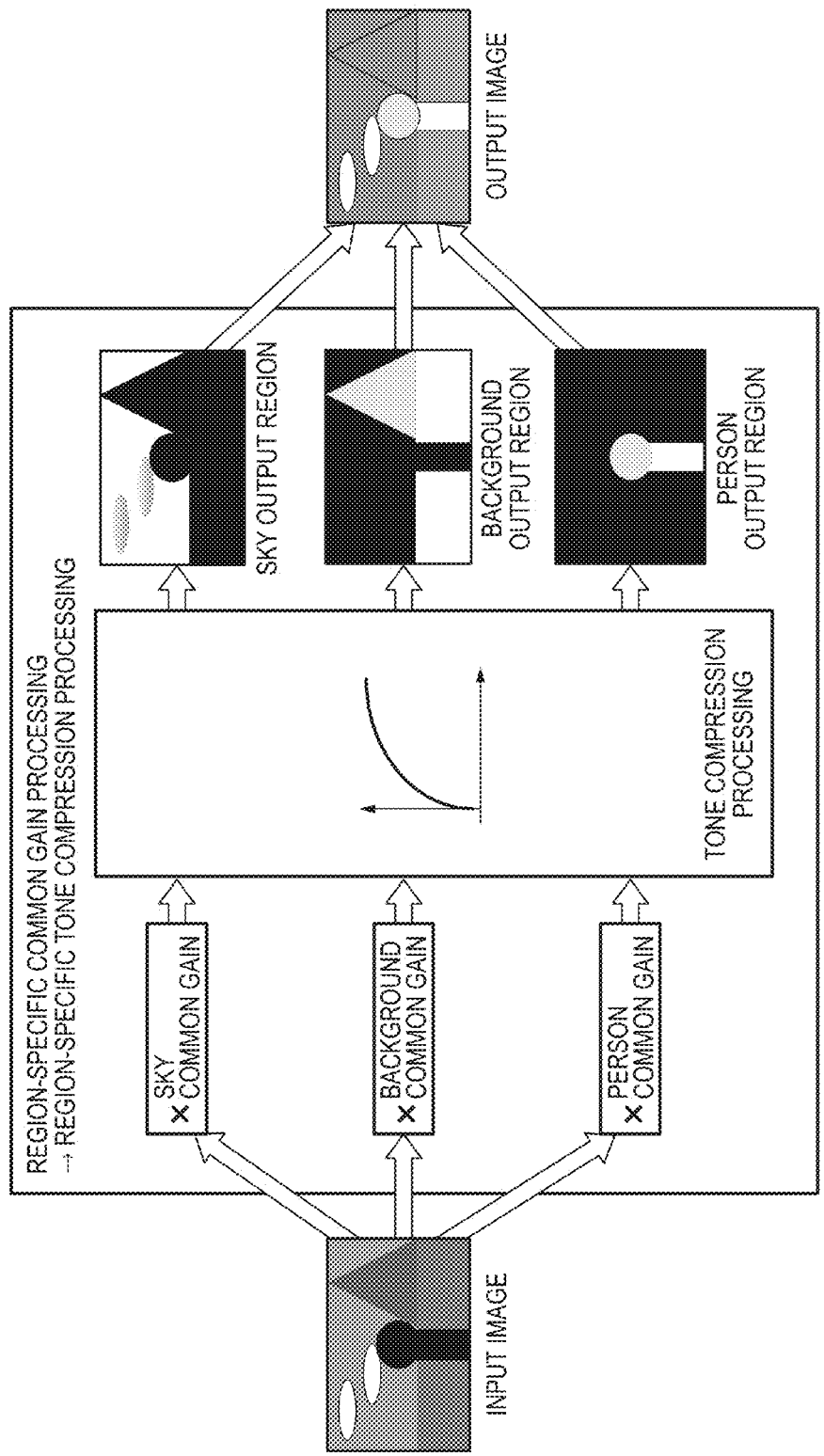
FIG. 18 is a view for explaining region-specific tone correction processing using one image.

An image processing apparatus that tone-compresses an input signal whose dynamic range (to be referred to as a D range hereafter) has been expanded will be described first in an embodiment of the present invention. In this embodiment of the present invention, tone correction processing optimal for each object region (to be referred to as a region-specific tone correction processing hereafter) is performed as a technique of bringing the tones and the D range of a given image near those seen by the human eye, in order to obtain an image with less blown-out highlights and blocked-up shadows. This technique is a technique of performing tone correction for each object region by using not only luminance information as in the related art, but also, an object region detection result upon performing processing like that shown in FIG. 18. The following description will refer to not only region-specific tone correction processing using one image as shown in FIG. 18, but also, region-specific tone correction processing while combining a plurality of images, as shown in FIG. 17. The processing in this case includes adjusting the combining ratios of a plurality of images with different exposures by using luminance information and an object region detection result, and generating one image by outputting different image signals for the respective object regions.

First Embodiment

Figure 1:
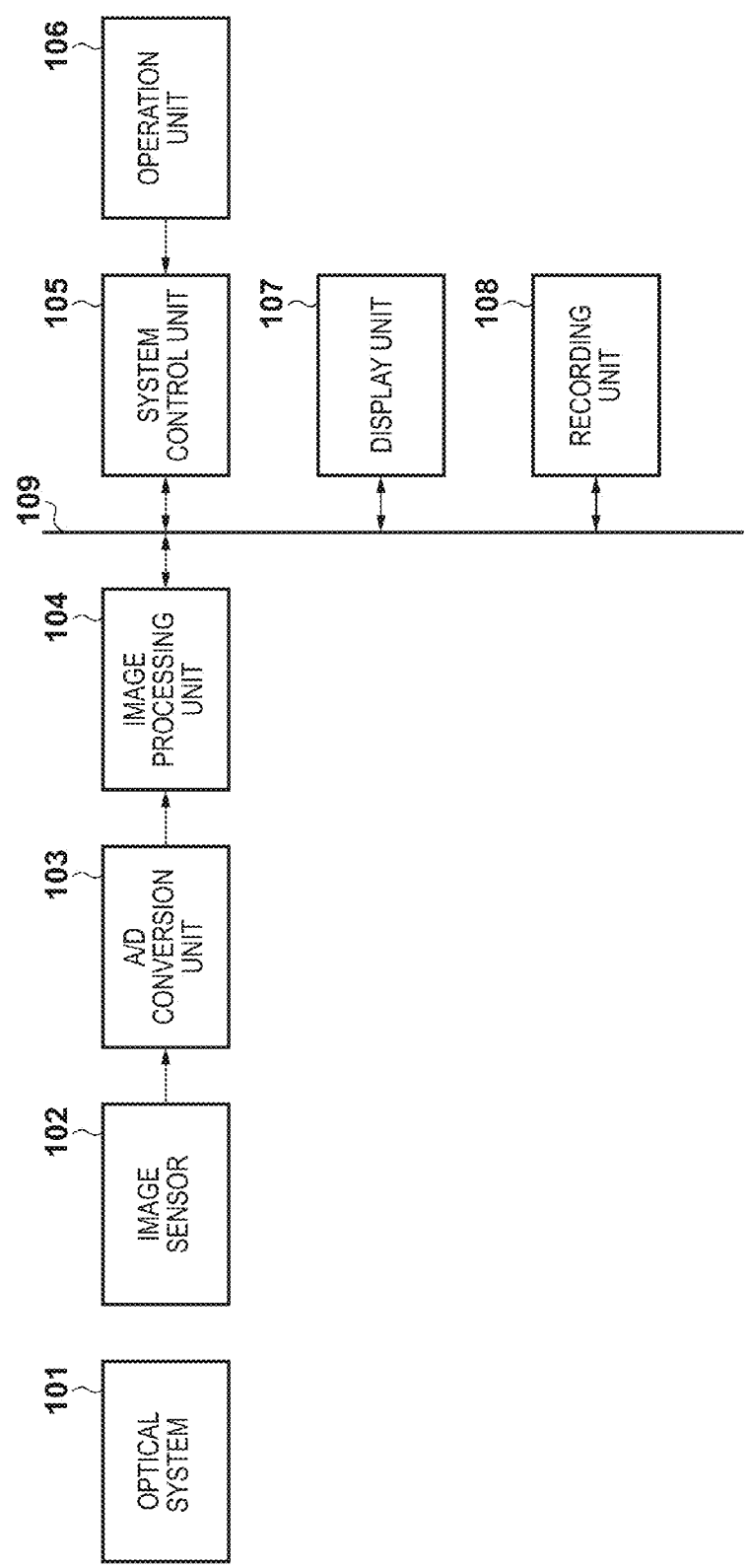
FIG. 1 is a block diagram showing the arrangement of an image processing apparatus according to the first embodiment of the present invention.

FIG. 1 is a block diagram showing the arrangement of an image processing apparatus according to the first embodiment of the present invention. Referring to FIG. 1, an optical system 101 includes a lens group constituted by a zoom lens and a focus lens, a stop adjustment device, and a shutter device. The optical system 101 adjusts the magnification, focus position, and light amount of an object image reaching an image sensor 102. The image sensor 102 is a photoelectric conversion device, such as a CCD or CMOS sensor, which photoelectrically converts a light beam from an object that has passed the optical system 101, into an electrical signal.

An A/D conversion unit 103 converts an input image signal into a digital image signal. An image processing unit 104 performs region-specific tone correction processing in addition to normal signal processing. The image processing unit 104 can perform the same processing for, not only an image output from the A/D conversion unit 103, but also, an image read out from a recording unit 108. A system control unit 105 is a control function unit that controls and manages the overall operation of the image processing apparatus according to this embodiment. The system control unit 105 also performs drive control of the optical system 101 and the image sensor 102 based on luminance values obtained from the image processed by the image processing unit 104 and instructions transmitted from an operation unit 106.

A display unit 107 is formed from a liquid crystal display or an organic EL (Electro Luminescence) display, and displays the image generated by the image sensor 102 or the image read out from the recording unit 108. The recording unit 108 has a function of recording images and may include, for example, an information recording medium using a memory card equipped with a semiconductor memory, a package housing a rotating recording medium, such as a magnetooptical disk, or the like. This information recording medium may be detachable. A bus 109 is used to exchange images between the image processing unit 104, the system control unit 105, the display unit 107, and the recording unit 108.

Figure 2:
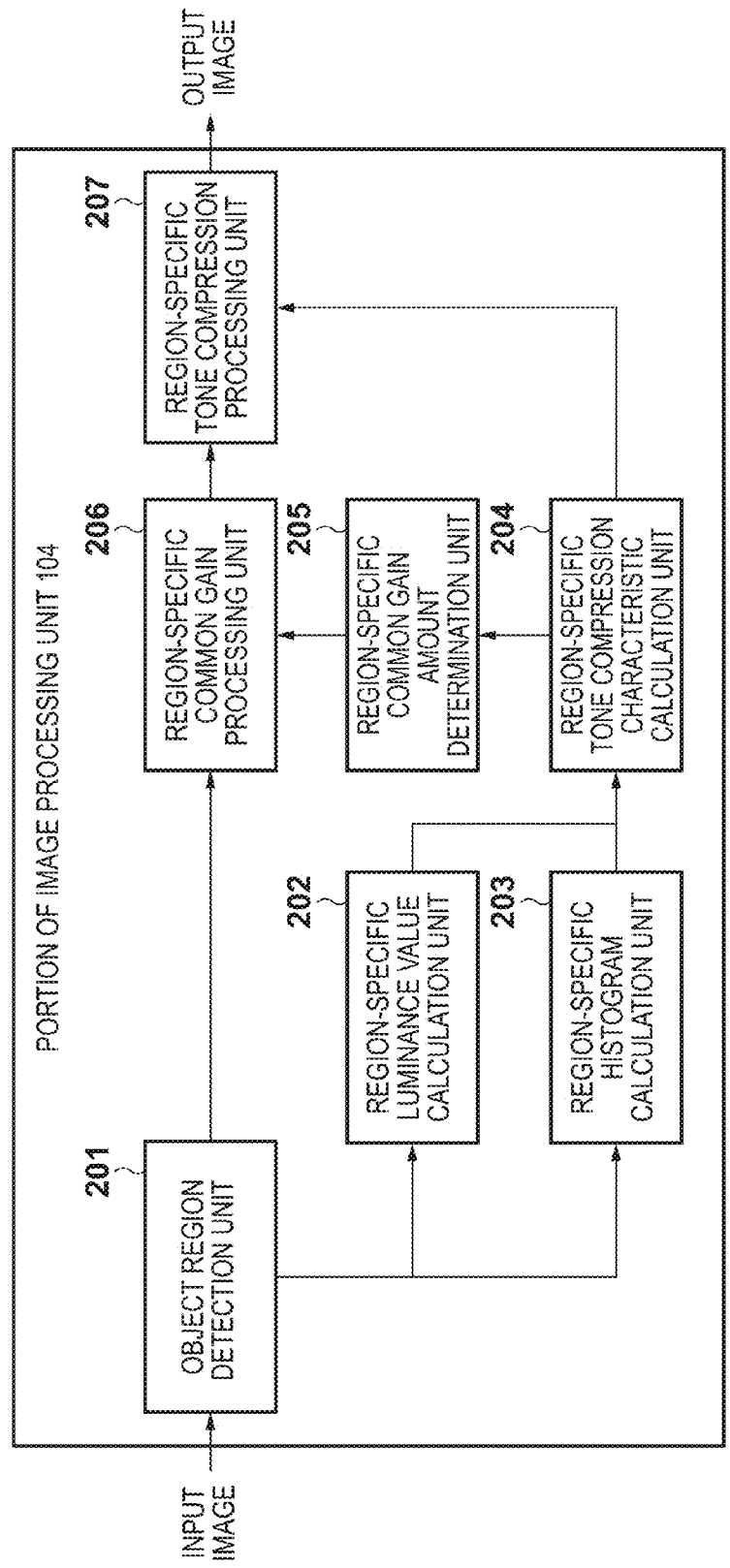
FIG. 2 is a block diagram showing an example of the concrete arrangement of a portion associated with region-specific tone correction processing in an image processing unit.

The concrete arrangement of a portion associated with region-specific tone correction processing in the image processing unit 104 will be described below. FIG. 2 is a block diagram showing an example of the concrete arrangement of the portion associated with region-specific tone correction processing in the image processing unit 104.

As shown in FIG. 2, the portion associated with region-specific tone correction processing in the image processing unit 104 of this embodiment includes an object region detection unit 201, a region-specific luminance value calculation unit 202, and a region-specific histogram calculation unit 203. This portion also includes a region-specific tone compression characteristic calculation unit 204, a region-specific common gain amount determination unit 205, a region-specific common gain processing unit 206, and a region-specific tone compression processing unit 207.

Figure 3:
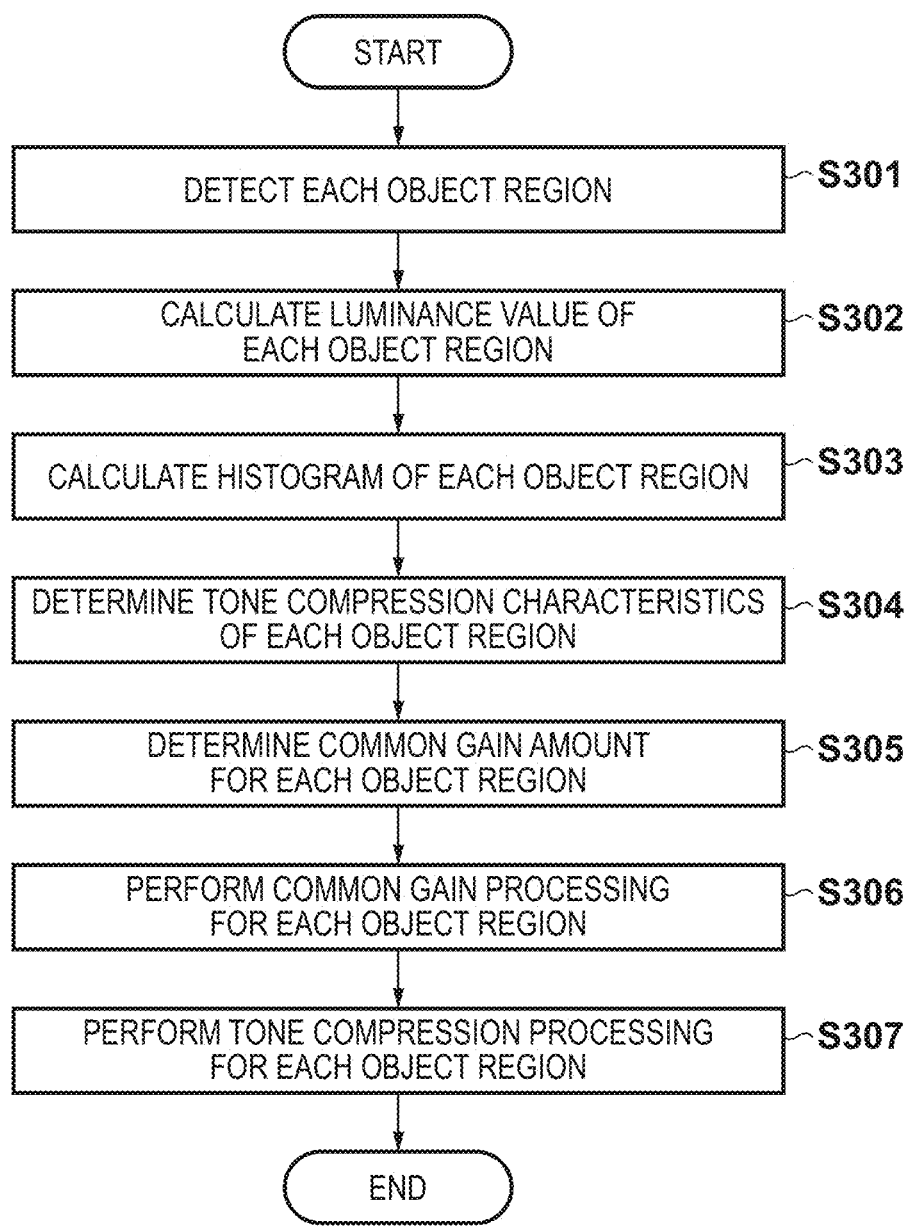
FIG. 3 is a flowchart showing overall region-specific tone correction processing in the image processing unit.

FIG. 3 is a flowchart showing the operation of the portion having the block arrangement shown in FIG. 2. The operation will be described below with reference to the flowchart of FIG. 3.

In step S301, an object region as a detection target is detected from an input image.

Figure 4:
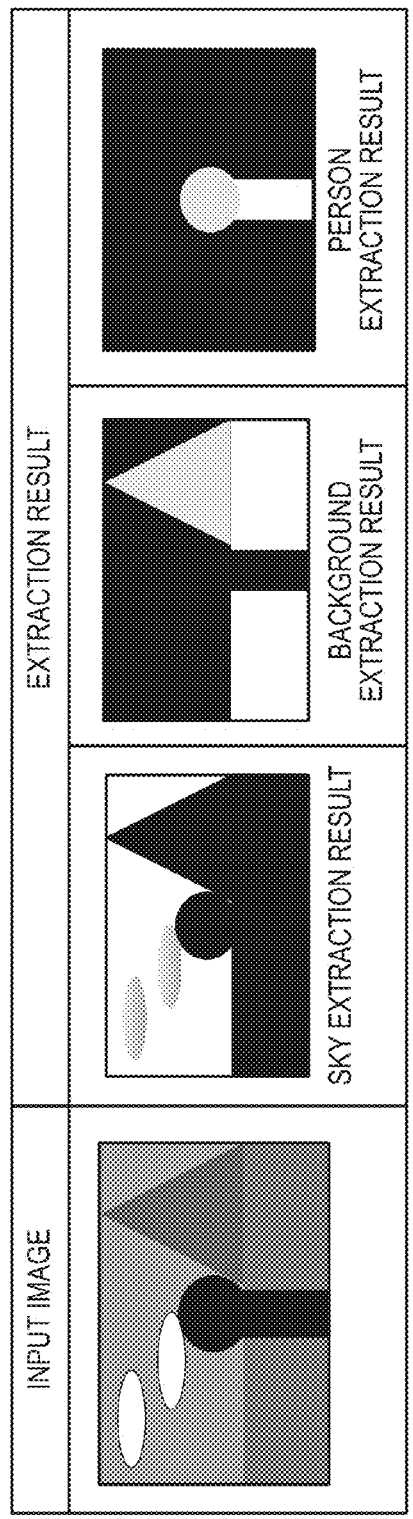
FIG. 4 is a view for explaining the processing contents of an object region detection unit.

The detection of an object region will be described with reference to FIG. 4. In this embodiment, as shown in FIG. 4, three regions, namely, a sky region, a background region, and a person region are detected. Note that the background region indicates a region other than the sky and the persons. The sky region includes cloud and sun regions. As shown in FIG. 4, in this embodiment, a signal representing an object region as a detection target is represented by one, and a signal representing other regions is represented by zero, thereby generating each object extraction result using a binary image. The manner of generating an extraction result is not limited to this. The information obtained by converting the image into a reliability may be used as an object extraction result.

In this embodiment, three regions, namely, a sky region, a background region, and a person region are respectively detected from a sky image, a background image, and a person image. It is possible, however, to select an image from which an object is to be detected and to determine an object region to be detected, in accordance with a shooting scene. It is possible to use, as an object detection method, a known method, such as an object recognition method, based on a neural network and using learning data (see, for example, Japanese Patent Laid-Open No. 2006-39666). The object region detection unit 201 in FIG. 2 performs the processing in step S301.

The processing in step S302, and the subsequent steps, will be described by referring back to FIG. 3. In step S302, the luminance value of each object region is calculated by using the object region detection result obtained by the processing in step S301 (representative luminance value calculation). In this embodiment, the average value of luminance values (average luminance value) is calculated for each of the sky, background, and person regions by using the sky image, and is set as the luminance value of each object region. It is also possible to use a method of calculating luminance values, instead of average luminance values, by using weights corresponding to coordinates. It is also possible to change the method of calculating luminance values depending on the type of an object region. The region-specific luminance value calculation unit 202 in FIG. 2 performs the processing in step S302.

In step S303, the histogram of a luminance signal is calculated for each object region by using the object region detection result obtained by the processing in step S301

(luminance distribution calculation). In step S304, tone compression characteristics are determined for each object region by using the luminance value calculated for each object region in step S302 and the histogram calculated for each object region in step S303. Note that tone compression processing is the processing of compressing an (m+n)-bit input signal into an m-bit output signal when m≥0 and n≥0. In this embodiment, this processing uses a compression method as a known technique that uses gamma curves (see, for example, Japanese Patent Laid-Open No. 2010-193099). The region-specific tone compression characteristic calculation unit 204 in FIG. 2 performs the processing in step S304. The processing in step S304 will be described in detail with reference to the flowchart of FIG. 6.

The processing in step S305 will be described by referring back to FIG. 3. In step S305, the common gain amount of each object region is determined based on the tone compression characteristics of each object region determined in step S304. The common gain amount of each object region is calculated by using D range compression amounts SKY_comp, BACK_comp, and HUMAN_comp of the sky, background, and person regions and tentative common gain amounts SKY_GAIN0, BACK_GAIN0, and HUMAN_GAIN0 of the sky, background, and person regions according to equations (1). The D range compression amounts SKY_comp, BACK_comp, and HUMAN_comp of the sky, background, and person regions will be described in detail later.

$$\text{SKY\_GAIN} = 2^{\left(LOG_2(SKY\_GAIN0) - LOG_2\left(\frac{1}{SKY\_comp}\right)\right)}$$ (1)

$$\text{BACK\_GAIN} = 2^{\left(LOG_2(BACK\_GAIN0) - LOG_2\left(\frac{1}{BACK\_comp}\right)\right)}$$

$$\text{HUMAN\_GAIN} = 2^{\left(LOG_2(HUMAN\_GAIN0) - LOG_2\left(\frac{1}{HUMAN\_comp}\right)\right)}$$

After common gain amounts SKY_GAIN, BACK_GAIN, and HUMAN_GAIN of the sky, background, and person regions are calculated according to equations (1), the process shifts to the processing in step S306.

In step S306, the common gain is multiplied for each object region based on the common gain amount calculated for each object region in step S305. In step S307, after the common gain is multiplied for each object region in step S306, tone compression processing is performed for each object region based on the tone compression characteristics calculated for each object region in step S304, and the resultant information is output. This processing is terminated.

Figure 5:
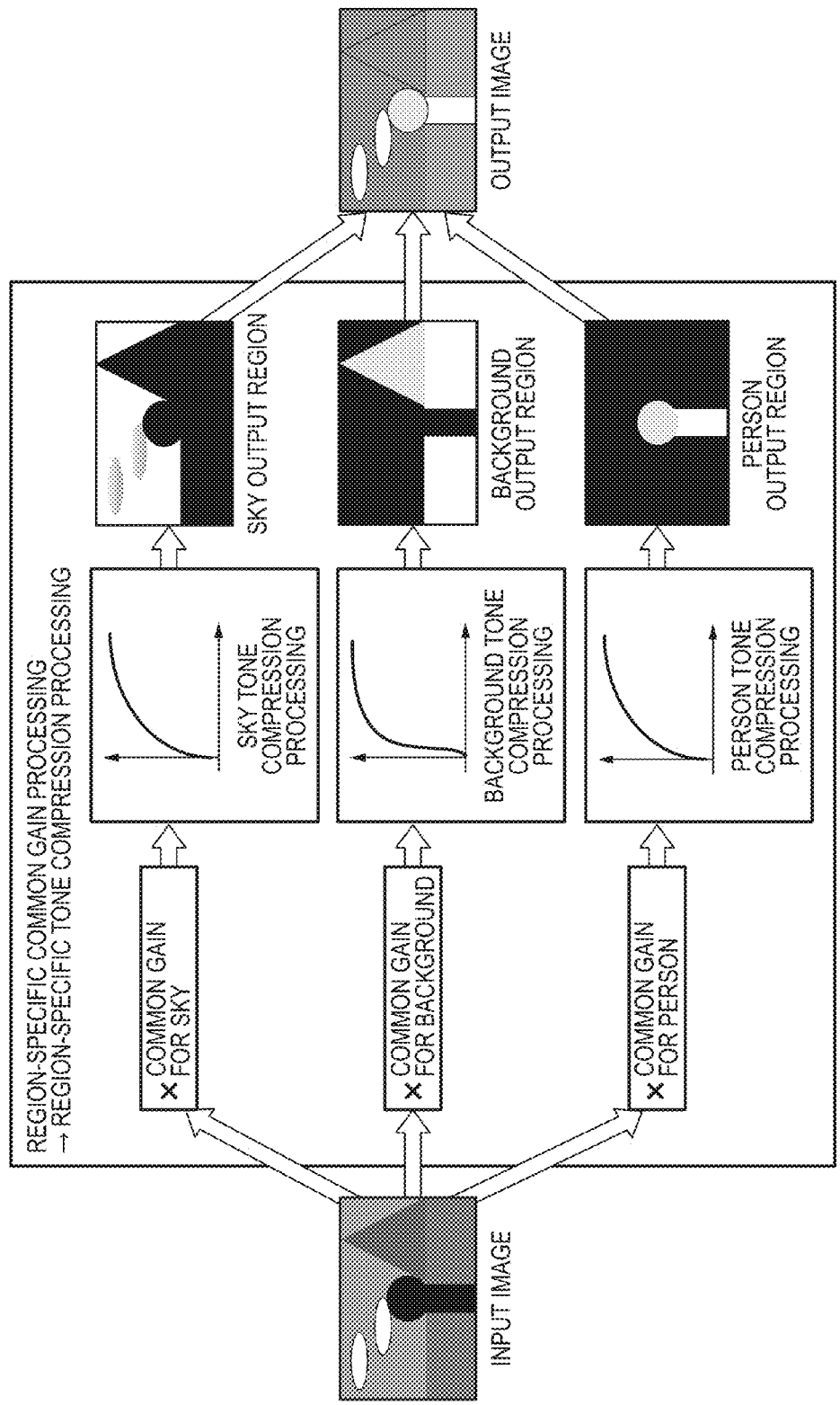
FIG. 5 is a view for explaining procedures for region-specific common gain processing and region-specific tone compression processing.

FIG. 5 shows the processing in steps S306 and S307. After an input image corresponding to each object region is prepared from the input image, different types of common gain processing and tone compression processing are performed for each input image. The resultant information is output for each object region. With this procedure, one output image is generated. The common gain for the sky region, the common gain for the background region, and the common gain for the person region in FIG. 5 indicate SKY_GAIN, BACK_GAIN, and HUMAN_GAIN calculated in step S305. In addition, tone compression characteristics (tone curves) obtained by sky tone compression processing, background tone compression processing, and person tone compression processing are SKY_γ, BACK_γ, and HUMAN_γ calculated in step S304.

The processing of determining tone compression characteristics of each object region in step S304 will be described in detail next.

Figure 6:
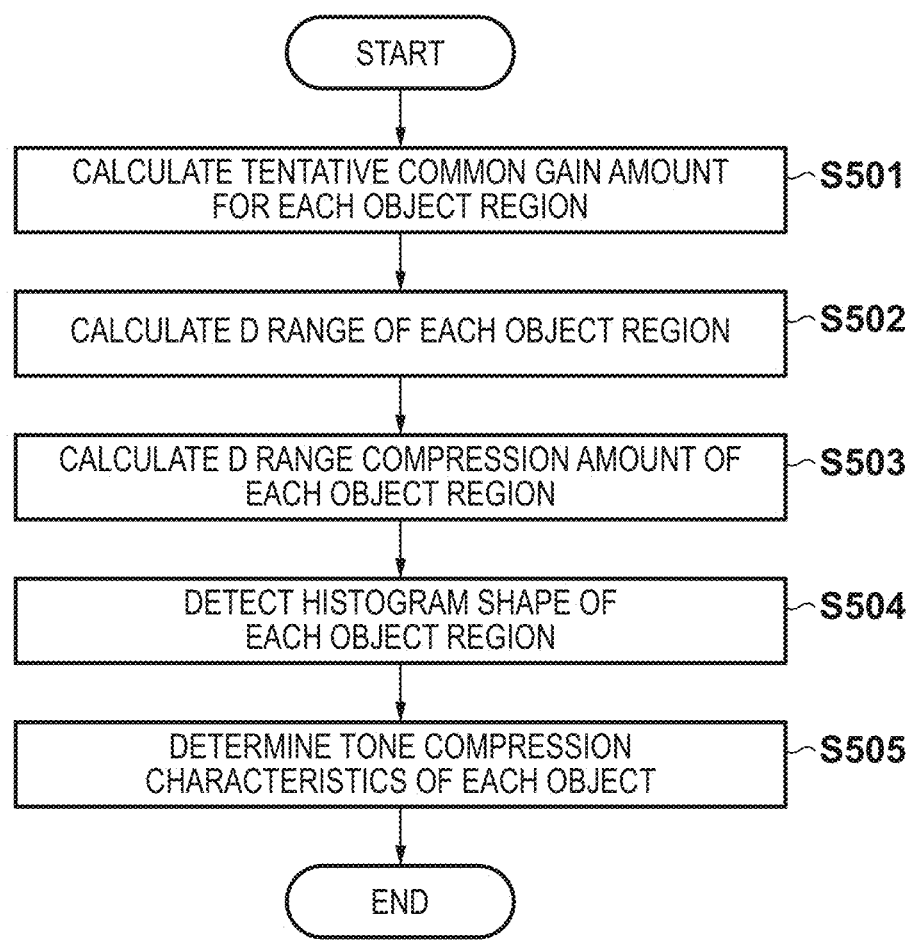
FIG. 6 is a flowchart for the determination of the tone compression characteristics of each object region.

FIG. 6 is a flowchart for step S304. The processing in step S304 will be described with reference to FIG. 6.

In step S501, a tentative common gain amount is calculated for each object region. The tentative common gain amounts are used in the processing in steps S502 and S503. The luminance values of the sky, background, and person regions are respectively represented by SKY_Y, BACK_Y, and HUMAN_Y. In addition, the target luminance values of the the sky, background, and person regions are respectively represented by Yref_SKY, Yref_BACK, and Yref_HUMAN. The luminance level differences (the relationships in luminance value between the object regions) between the object regions are calculated according to equations (2) by using the above luminance values and target luminance values, and common gain amounts are determined by using the luminance level differences. That is, a luminance level difference ΔBH between the background and person regions, a luminance level difference ΔSH between the sky and person regions, and a luminance level difference ΔBS between the background and person regions are given by:

$$\Delta BH = \text{ABS}\left(LOG_2\left(\frac{Y\_HUMAN}{Yref\_HUMAN}\right) - LOG_2\left(\frac{Y\_BACK}{Yref\_BACK}\right)\right)$$ (2)

$$\Delta SH = \text{ABS}\left(LOG_2\left(\frac{Y\_HUMAN}{Yref\_HUMAN}\right) - LOG_2\left(\frac{Y\_SKY}{Yref\_SKY}\right)\right)$$

$$\Delta BS = \text{ABS}\left(LOG_2\left(\frac{Y\_BACK}{Yref\_BACK}\right) - LOG_2\left(\frac{Y\_SKY}{Yref\_SKY}\right)\right)$$

The calculation of the common gains of the respective object regions using the luminance level differences ΔBH, ΔSH, and ΔBS is performed by using a region-specific tone correction processing method. The tentative common gain amounts of the sky, background, and person regions calculated by this method are respectively represented by SKY_GAIN0, BACK_GAIN0, and HUMAN_GAIN0. The unit of gain amount is expressed by a multiple. For example, if the tentative common gain amount of the person region is double, the value of HUMAN_GAIN0 is 2.

In step S502, the D range of each object region is calculated. This D range is the one required for each object region in terms of brightness when gain processing is performed based on the tentative common gain amounts calculated in step S501.

A method of calculating the D range of each object region in step S502 will be described with reference to FIGS. 7A and 7B. FIG. 7A is the histogram of the person region calculated with respect to the input image. As shown in FIG. 7A, the width from the minimum signal value to the maximum signal value of the signal values present in the person region is calculated as the D range of the person region of the input image.

If, however, the person region is multiplied by a common gain as shown in FIG. 7B, the D range is expanded in proportion to the gain amounts. In consideration of this, the D range of the person region corresponding to target brightness is calculated by multiplying the D range of the person region of the input image by the tentative common gain amount HUMAN_GAIN0 of the person region calculated in step S501.

The D ranges of the respective object regions of the input image are respectively represented by HUMAN_

IN_D_range, BACK_IN_D_range, and SKY_IN_D_range. Letting IN_D_range be a D range corresponding to the bit count of a signal of the input image, D range amounts HUMAN_D_range, BACK_D_range, and SKY_D_range required for the respective object regions are calculated according to equations (3). Note that values of HUMAN_D_range, BACK_D_range, and SKY_D_range are expressed as ratios, with the value of IN_D_range being one. In this embodiment, when this ratio becomes one or less, the value is controlled to be clipped to one.

HUMAN_$D$_range=(HUMAN_IN_$D$_range×HU-MANGAIN0)/IN_$D$_range

BACK_$D$_range=(BACK_IN_$D$_range×BACK-GAIN0)/IN_$D$_range

SKY_$D$_range=(SKY_IN_$D$_range×SKYGAIN0)/IN_$D$_range  (3)

The processing in step S503 and the subsequent steps will be described by referring back to FIG. 6. In step S503, the D range compression amount of each object region is calculated based on the D range of each object region calculated in step S502 and the luminance level differences between a target object region and other object regions. For example, the D range compression amount of the background region is calculated based on the D range of the background region, the luminance level difference ΔBH between the background region and the person region, and the luminance level difference ΔBS between the background region and the sky region. If a D range compression amount is simply calculated based on only the D range of each object region, the resultant composite image becomes unnatural, because no consideration is given to the balance between each object region and other object regions. For this reason, the D range compression amount of a target object region is calculated in accordance with, not only the D range of the target object region, but also, the luminance level differences between the target object region and other object regions.

Figure 8:
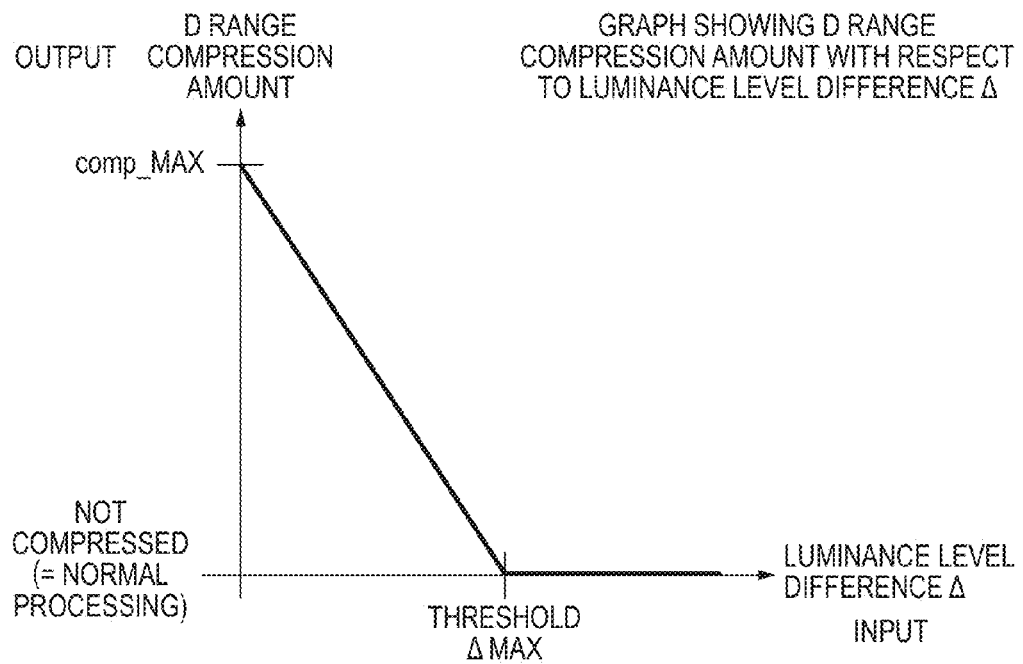
FIG. 8 is a graph used when calculating a D range compression amount.

A method of calculating the D range compression amount of a target object region will be described with reference to FIG. 8. FIG. 8 is a graph with the abscissa representing luminance level differences and the ordinate representing D range compression amounts.

Let comp_MAX be a D range compression amount corresponding to the D range of a target object region, and ΔMAX on the abscissa be a threshold for switching to the processing of inhibiting tone compression without expanding a D range as normal processing when the luminance level difference is equal to or more than a predetermined value. As for a luminance level difference input to the graph of FIG. 8, a largest one of the luminance level differences between the target object region and other object regions is input. Note that a D range compression amount is expressed by a ratio with IN_D_range being one. For example, the value of a D range compression amount that compresses the D range by one level wider than the normal range is ½. In addition, when performing neither expanding a D range nor tone compression as normal processing, the above value is expressed by one.

As described above, the D range compression amount of a target object region is calculated by using a graph designed such that the larger the luminance level difference, the nearer the D range compression amount to the normal compression amount. With this processing, the D range compression amounts of the sky, background, and person regions are respectively calculated as SKY_comp, BACK_comp, and HUMAN_comp. Although in the above description, as a luminance level difference input to the table of FIG. 8, a largest one of the luminance level differences between the target object region and other object regions is input, another value may be input. For example, the input value may be the average value of a plurality of luminance level differences from the target object region or the value obtained by weighted computation of a plurality of luminance level differences from the target object region.

The processing in step S504 and the subsequent steps will be described by referring back to FIG. 6. In step S504, the histogram shape of each object region is detected. Detecting this histogram shape will determine whether many signal values are distributed on the low-luminance side or high-luminance side, or on neither of the sides.

Figure 9:
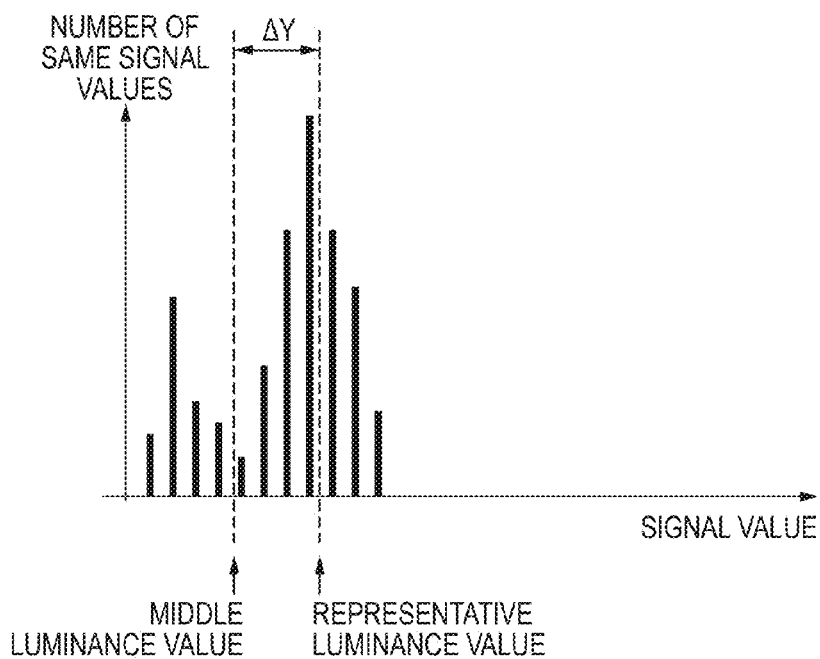
FIG. 9 is a graph for explaining histogram shape detection.

The detection of a histogram shape will be described with reference to FIG. 9. First of all, a middle luminance value is calculated from the histogram of a target object region. In this embodiment, letting MAX_Y and MIN_Y be the maximum and minimum signal values of luminance signals of the target object region, a middle luminance value MID_Y is calculated by $$MID\_Y=(MAX\_Y+MIN\_Y)/2 \quad (4)$$

A difference ΔY between MID_Y calculated by equation (4) and the luminance value of the target object region calculated in step S302 is calculated. Equation (5) is the one used when the target object region is the background region.

$$\Delta_Y = BACK\_Y - MID\_Y \quad (5)$$

Lastly, a histogram shape HIST_TYPE is determined depending on whether the value of ΔY calculated by equation (5) is equal to or more than a threshold or less than the threshold.

Δ$Y$<$TH$1 ⇒ HIST_TYPE=0

$TH$1≤Δ$Y$<$TH$2 ⇒ HIST_TYPE=1

$TH$2_Δ ⇒ HIST_TYPE=2  (6)

If the value of HIST_TYPE is zero, it is determined that the histogram has a shape with many signal values being distributed on the low-luminance side. If the value of HIST_TYPE is two, it is determined that the histogram has a shape with many signal values being distributed on the high-luminance side. In addition, if the value of HIST_TYPE is one, it is determined that the histogram has a shape other than the above two shapes. The values of TH1 and TH2 in equation (6) may be changed for each object or in accordance with a scene. For example, in some cases, when the histogram of a person region greatly changes in shape due to, for example, the influence of the clothing worn by the person, and the tone is changed, an unnatural image results. For this reason, when detecting the histogram shape of a person region, the range from TH1 to TH2 is set to be relatively wide.

The results detected by detecting the histogram shapes of the sky, background, and person regions using the above method are respectively represented by SKY_HIST_TYPE, BACK_HIST_TYPE, and HUMAN_HIST_TYPE.

The processing in step S505 and the subsequent steps will be described by referring back to FIG. 6. In step S505, the tone compression characteristics of each object region are determined based on the processing results obtained up to step S504. Tone compression characteristics indicate the shape of a gamma curve in this embodiment. In the processing after step S505, tone compression processing is performed in accordance with the shape of the gamma curve.

Tone compression using a gamma curve is a known technique (see, for example, Japanese Patent Laid-Open No. 2010-193099).

A method of determining tone compression characteristics will be described with reference to FIGS. 10A to 10C. FIGS. 10A, 10B, and 10C respectively correspond to cases in which the values of HIST_TYPE calculated in step S504 are zero, one, and two. As shown in FIG. 10A, when the histogram has a shape with many signal values being distributed on the low-luminance side, the tone compression characteristics used are those that hold tones on the low-luminance side and compress tones on the high-luminance side. As shown in FIG. 10B, when the histogram has a shape with signal values being distributed on both the low-luminance side and the high-luminance side in a well-balanced manner, the tone compression characteristics used are those that make the image have tones on both the high-luminance side and the low-luminance side in a well-balanced manner. Finally, as shown in FIG. 10C, when the histogram has a shape with many signal values being distributed on the high-luminance side, the tone compression characteristics used are those that hold tones on the high-luminance side and compress tones on the low-luminance side.

Note that the values of tone compression characteristics on the abscissa change in accordance with the D range compression amount calculated in step S503. It is possible to adopt a known technical idea concerning a change in value of tone compression characteristics on the abscissa in accordance with a D range compression amount (see, for example, Japanese Patent Laid-Open No. 2010-193099). The tone compression characteristics of the sky, background, and person regions determined by this method are respectively represented by SKY_γ, BACK_γ, and HUMAN_γ, and the processing in step S505 is terminated.

The processing in step S304 in FIG. 3 has been described above. According to the above processing, it is possible to generate an image with less saturated (blown-out highlights) and blocked-up shadows even in a scene in which the D range is wide within the same object region.

Second Embodiment

The second embodiment of the present invention will be described below with reference to the accompanying drawings. Note that, in this embodiment, region-specific tone correction processing is performed by using a plurality of images with different exposures. The second embodiment differs from the first embodiment in that tone compression characteristics are calculated before image shooting, and exposure control is performed for a plurality of images to be shot, and that an input image is determined for each object region, and only tone compression processing is performed for each object region without any common gain processing.

Figure 11:
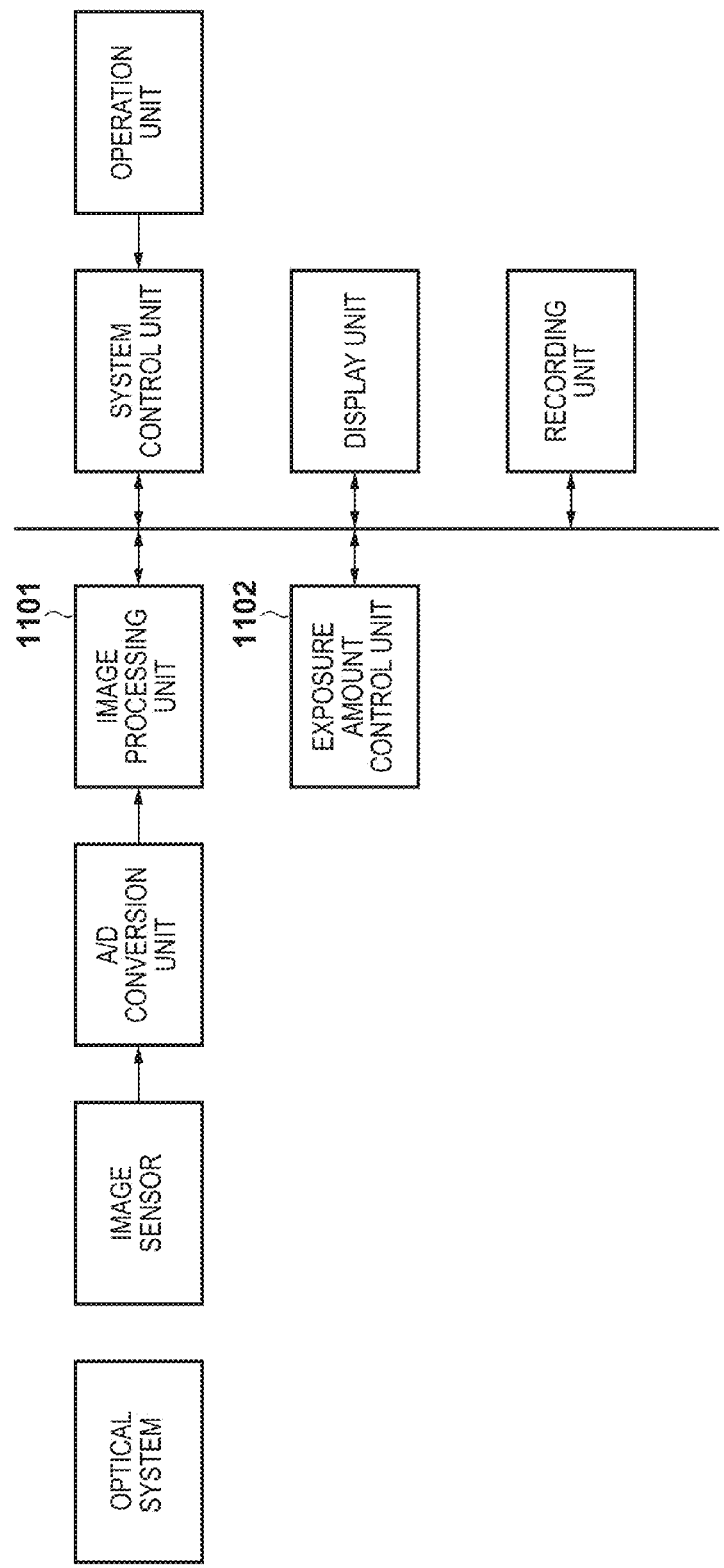
FIG. 11 is a block diagram showing the arrangement of an image processing apparatus according to the second embodiment of the present invention.

FIG. 11 is a block diagram showing the arrangement of an image processing apparatus according to the second embodiment. This arrangement is the same as that in the first embodiment, except that an exposure amount control unit 1102 is added, and an image processing unit 1101 performs region-specific tone correction processing differently, and hence, a description of the arrangement will be omitted.

The exposure amount control unit 1102 calculates tone compression characteristics for each object region, and determines an exposure amount for an image to be shot, which is required at the time of image shooting (exposure amount calculation), separately for each object region. The image processing unit 1101 receives a plurality of images shot with different exposure amounts according to output information from the exposure amount control unit 1102 as input images, and performs region-specific tone correction processing.

The processing contents in the exposure amount control unit 1102 and the image processing unit 1101 will be described in the order named.

Figure 12:
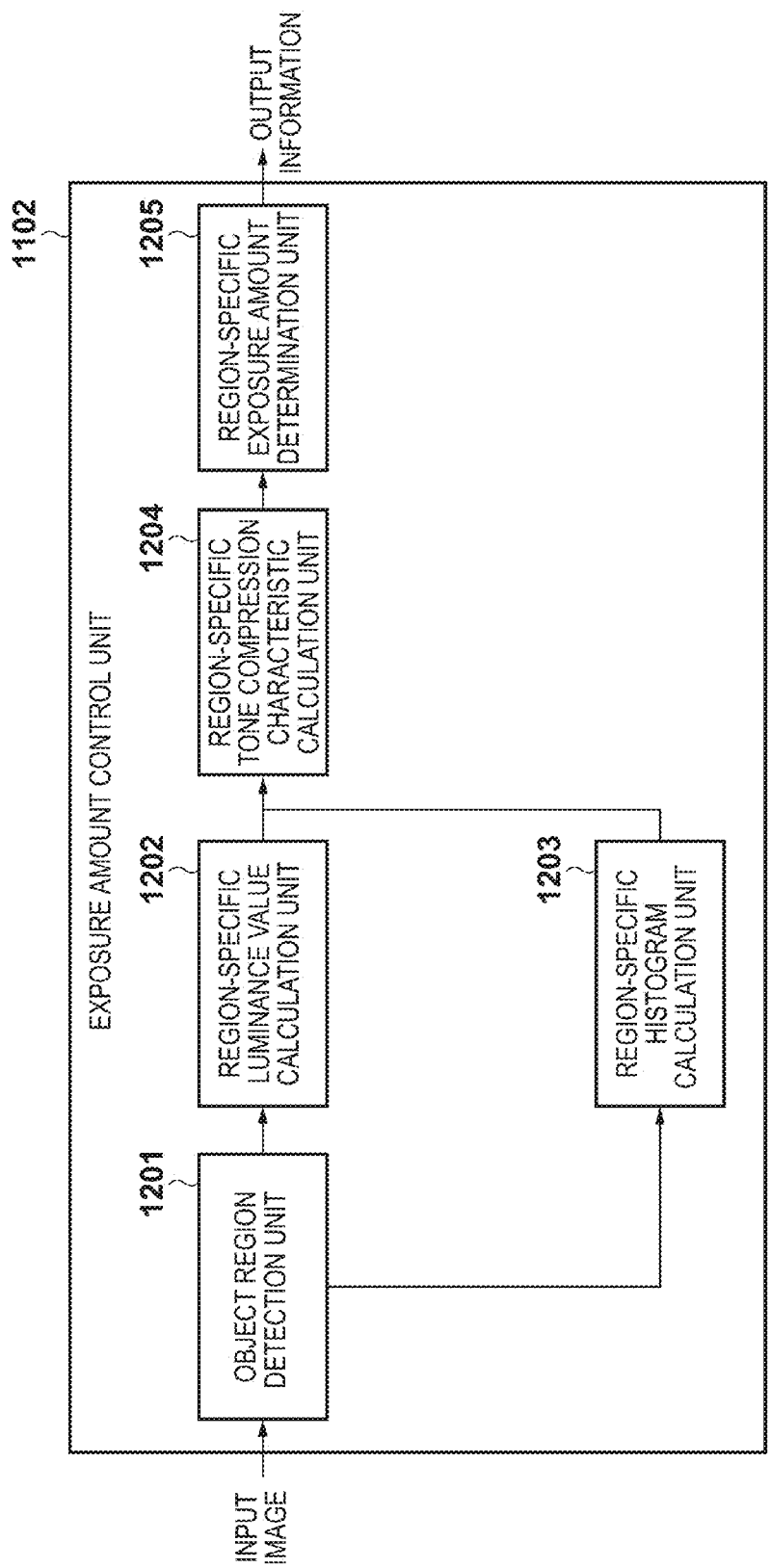
FIG. 12 is a block diagram showing an example of the concrete arrangement of a portion associated with region-specific tone correction processing in an exposure amount control unit.

FIG. 12 is a block diagram showing an example of the concrete arrangement of a portion associated with region-specific tone correction processing in the exposure amount control unit 1102. As shown in FIG. 12, the portion associated with region-specific tone correction processing includes an object region detection unit 1201, a region-specific luminance value calculation unit 1202, a region-specific histogram calculation unit 1203, a region-specific tone compression characteristic calculation unit 1204, and a region-specific exposure amount determination unit 1205.

Figure 13:
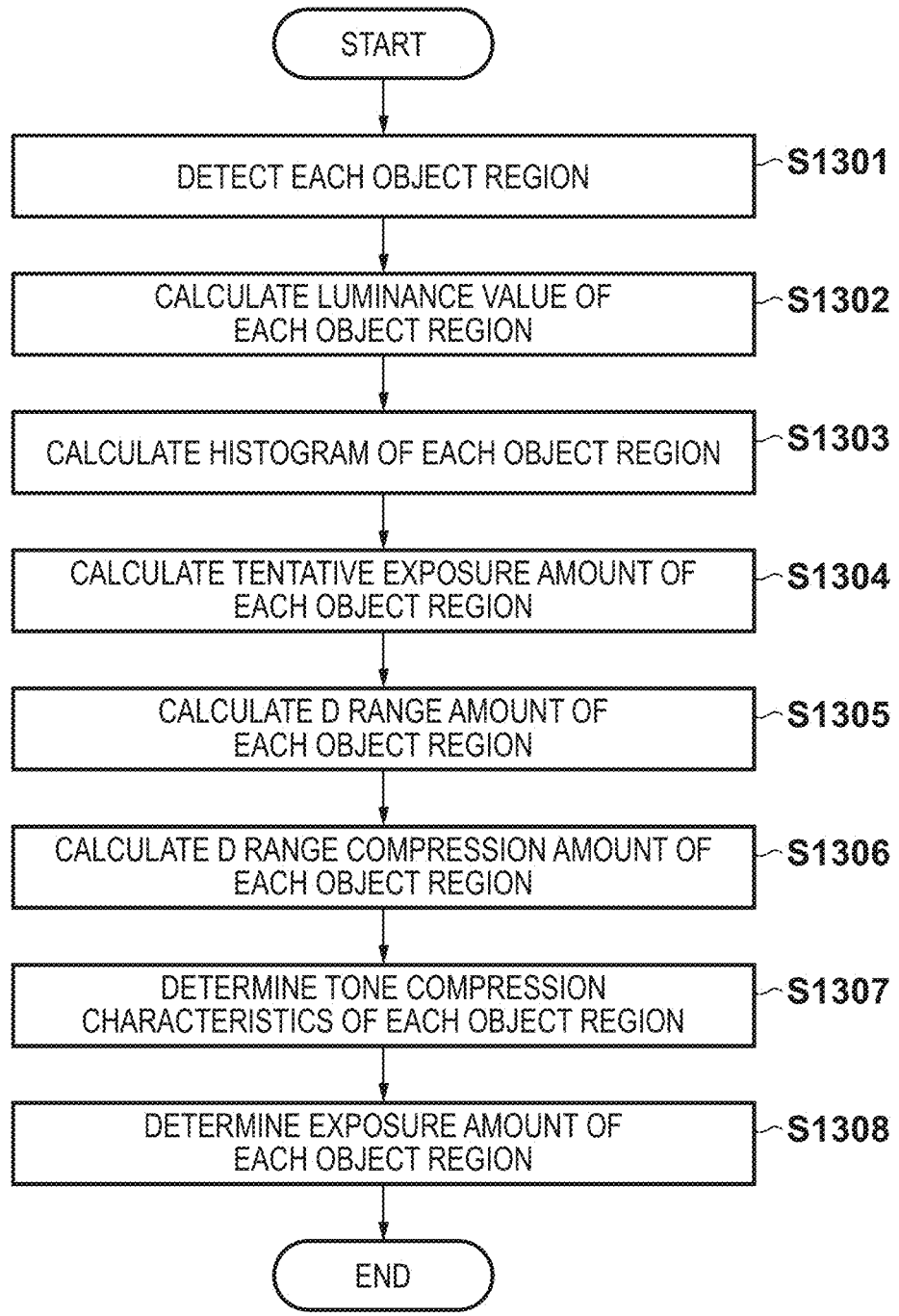
FIG. 13 is a flowchart showing overall region-specific tone correction processing in the exposure amount control unit.

FIG. 13 is a flowchart showing the operation of the portion having the block arrangement shown in FIG. 12. The operation will be described below with reference to the flowchart of FIG. 13.

In this embodiment, the exposure amount control unit 1102 uses an EVF image as an input image. An EVF image is a so-called live view image, which is not recorded in a recording unit 108, but is displayed on a display unit 107. Since the processing from step S1301 to step S1303 is the same as that in the first embodiment, a description of the processing will be omitted. The object region detection unit 1201, the region-specific luminance value calculation unit 1202, and the region-specific histogram calculation unit 1203 respectively perform the processing in step S1301, the processing in step S1302, and the processing in step S1303.

In step S1304, a tentative exposure amount for each object region is calculated. A tentative exposure amount indicates the amount of change in the exposure amount of an input image. This amount of change can be calculated from the luminance value of each object calculated in step S1302 according to the same idea as that of a tentative common gain in the first embodiment.

Assume that the tentative exposure amounts of the sky, background, and person regions calculated by the above method are respectively represented by ΔBv_SKY0, ΔBv_BACK0, and ΔBv_HUMAN0. Exposure amounts are represented by APEX values. If, for example, it is proper to increase the brightness of the sky by one level with respect to the exposure amount of the current input image, the value of ΔBv_SKY is −1. Note that the region-specific tone compression characteristic calculation unit 1204 performs the processing in step S1304.

Since the processing from step S1305 to step S1307 is the same as that in the first embodiment, a description of the processing will be omitted. As SKY_GAIN0, BACK_GAIN0, and HUMAN_GAIN0 calculated as tentative common gain amounts in the description of the first embodiment, the values calculated by equations (7) are used.

$$SKY\_GAIN0 = 2^{-\Delta Bv\_SKY}$$

$$BACK\_GAIN0 = 2^{-\Delta Bv\_BACK}$$

$$HUMAN\_GAIN0 = 2^{-\Delta Bv\_HUMAN} \quad (7)$$

Note that SKY_GAIN0, BACK_GAIN0, and HUMAN_GAIN0 are used for only the processing from step S1305 to step S1307. Note that the region-specific tone compression characteristic calculation unit 1204 performs the processing from step S1305 to step S1307.

In step S1308, the exposure amount of each object region is determined based on the D range compression amount of each object region calculated in step S1306. This exposure amount indicates the amount of change in the exposure amount of the input image. As in the first embodiment, as the D range compression amounts of the sky, background, and person regions as SKY_comp, BACK_comp, and HUMAN_comp, exposure amounts ΔBv_SKY, ΔBv_BACK, and ΔBv_HUMAN of the sky, background, and person regions are calculated by equations (8).

$$\Delta Bv\_SKY = \Delta Bv\_SKY0 + LOG_2\left(\frac{1}{SKY\_comp}\right) \quad (8)$$

$$\Delta Bv\_BACK = \Delta Bv\_BACK0 + LOG_2\left(\frac{1}{BACK\_comp}\right)$$

$$\Delta Bv\_HUMAN = \Delta Bv\_HUMAN0 + LOG_2\left(\frac{1}{HUMAN\_comp}\right)$$

Note that the region-specific exposure amount determination unit 1205 performs the processing in step S1308. With that, the description of the exposure amount control unit 1102 is ended.

Images with exposure amounts for the sky, background, and person regions are acquired based on the exposure amounts of the respective object regions calculated in step S1308. These images will be referred to as a sky image, a background image, and a person image. After the acquisition of the sky image, the background image, and the person image, the image processing unit 1101 performs processing.

Figure 14:
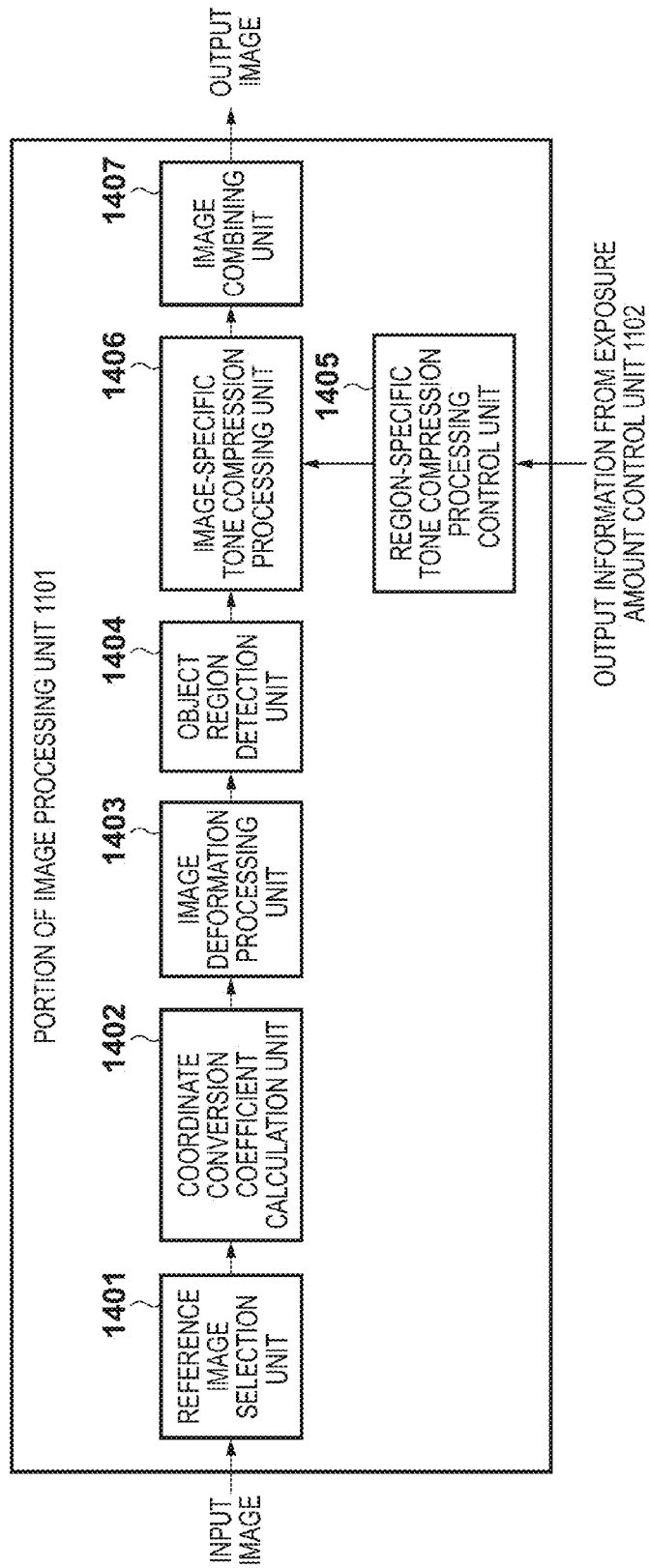
FIG. 14 is a block diagram showing an example of the concrete arrangement of a portion associated with region-specific tone correction processing in an image processing unit.

FIG. 14 is a block diagram showing an example of the concrete example of a portion associated with region-specific tone correction processing in the image processing unit 1101. As shown in FIG. 14, the concrete arrangement of the portion associated with region-specific tone mapping processing includes a reference image selection unit 1401, a coordinate transformation coefficient calculation unit 1402, and an image deformation processing unit 1403. This portion further includes an object region detection unit 1404, a region-specific tone compression processing control unit 1405, an image-specific tone compression processing unit 1406, and an image combining unit 1407. Inputs include shot images called a sky image, a background image, and a person image, and output information from the exposure amount control unit 1102 including the tone compression characteristics of each object region.

Figure 15:
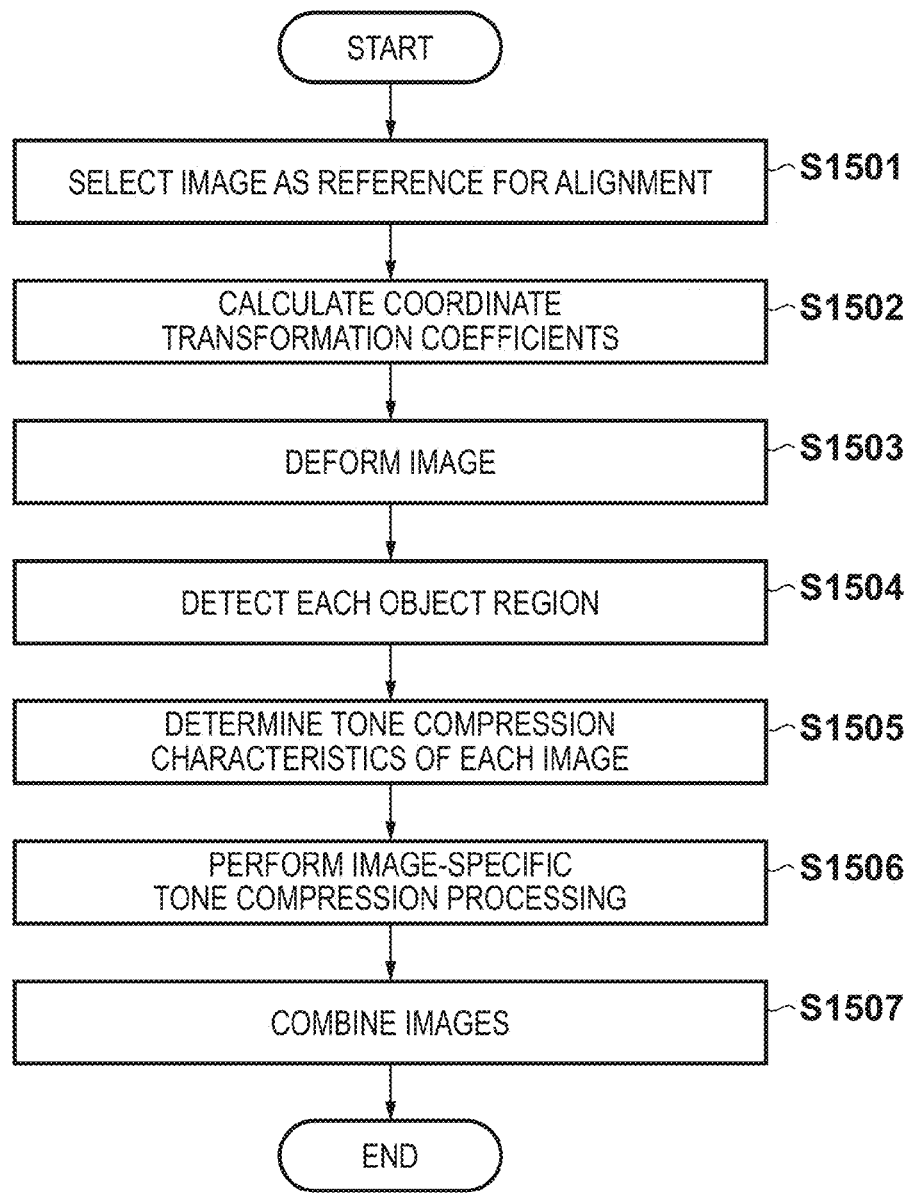
FIG. 15 is a flowchart showing overall region-specific tone correction processing in the image processing unit.

FIG. 15 is a flowchart showing the operation of the portion having the block arrangement shown in FIG. 14. The operation will be described below with reference to the flowchart of FIG. 15.

In step S1501, an image as a reference is selected for the alignment of the input images with different exposures. In this embodiment, as an image as a reference for alignment, an image with a middle exposure amount among those of the three input images is selected. The reference image selection unit 1401 in FIG. 14 performs the processing in step S1501.

In step S1502, with respect to the image as the reference for alignment selected in step S1501, coordinate transformation coefficients for the alignment of the remaining input images are calculated. For the calculation of coordinate transformation coefficients, in this embodiment, the positional shift amounts among the images are detected, and coordinate transformation coefficients are calculated from the detected positional shift amounts. As a method of detecting positional shift amounts, it is possible to use a known method such as a method using pattern matching.

In addition, in this embodiment, coefficients α0 to α7 in projective transformation equations (9) are calculated as coordinate transformation coefficients. As a calculation method, it is possible to use a known method using a least square method, or the like.

$$x' = \frac{a_0 x + a_1 y + a_2}{a_6 x + a_7 y + 1} \quad (9)$$

$$y' = \frac{a_3 x + a_4 y + a_5}{a_6 x + a_7 y + 1}$$

The coordinate conversion coefficient calculation unit 1402 in FIG. 14 performs the processing in step S1502.

In step S1503, the coordinate transformation of the input images, other than the image selected as a reference for alignment, is performed based on the coordinate transformation coefficients calculated in step S1502, thereby deforming the images. The image deformation processing unit 1403 in FIG. 14 performs the processing in step S1503.

In step S1504, object regions are detected from the respective images aligned by the processing in step S1503. Since a method of detecting object regions is the same as that in the first embodiment, a description of the method will be omitted. The object region detection unit 1404 in FIG. 2 performs the processing in step S1504.

In step S1505, readout processing for tone compression characteristics corresponding to an input image for each object is performed from output information from the exposure amount control unit 1102. Assume that the tone compression characteristics of the sky, background, and person regions read in step S1505 are respectively represented by SKY_γ, BACK_γ, and HUMAN_γ. SKY_γ, BACK_γ, and HUMAN_γ are determined as tone compression characteristics for the execution of tone compression processing for the air image, the background image, and the person image, and the process shifts to step S1506. The region-specific tone compression processing control unit 1405 performs the processing in step S1505.

In step S1506, tone compression processing is performed for the respective objects by using the tone compression characteristics SKY_γ, BACK_γ, and HUMAN_γ corresponding to the images for the respective objects determined in step S1505. Note that the image-specific tone compression processing unit 1406 performs the processing in step S1506.

In step S1507, the images having undergone the tone compression processing in step S1506 are respectively output as the sky image for the sky region, the background image for the background region, and the person image for the person region to generate one composite image. The processing is then terminated. Note that the image combining unit 1407 performs the processing in step S1507.

Figure 16:
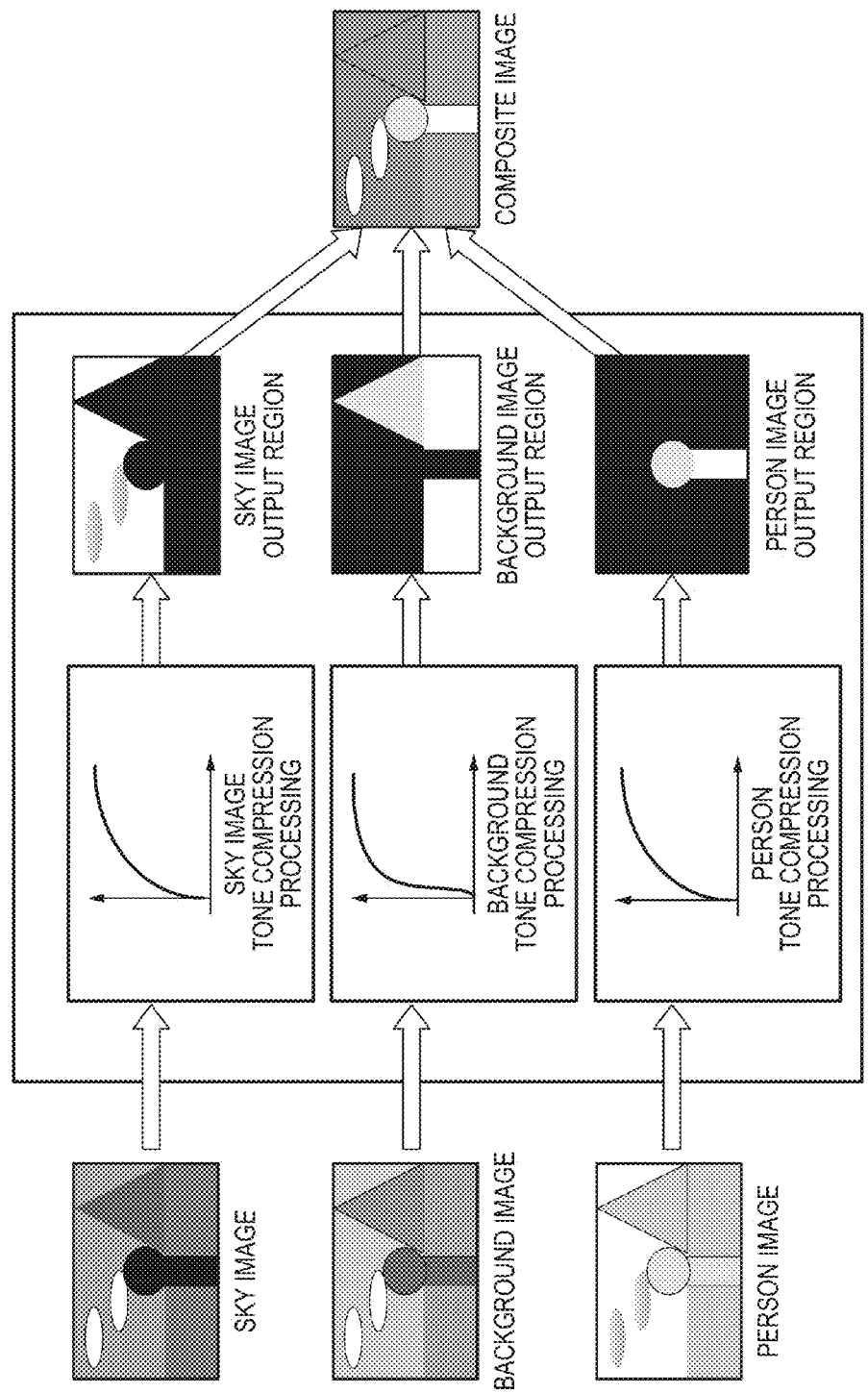
FIG. 16 is a view for explaining procedures for region-specific tone compression processing and image combining processing.

FIG. 16 is a view showing the processing from step S1506 to step S1507. As shown in FIG. 16, tone compression processing for each object is performed for each of the sky, background, and person images with different exposures. Tone compression processing is performed with SKY_γ, BACK_γ, and HUMAN_γ respectively representing the tone characteristics of the sky image, the background image, and the person image. After the tone compression processing, the sky image, the background image, and the person image are respectively output as a sky region, a background region, and a person region, based on output regions indicated by the white regions, thereby generating one composite image.

According to the above processing, it is possible to generate an image with less saturated regions and blocked-up shadow regions, even in a scene in which the D range is wide within the same object region.

In addition, the functions of the embodiments above can be implemented by supplying a recording medium storing software program codes for implementing the functions of the above embodiments to a system or an apparatus such as a computer, and causing the control unit (CPU, MPU, or a unit including them) of the system or the apparatus to read out and to execute the program codes stored in the recording medium.

In this case, the program codes read out from the recording medium implement the functions of the above embodiments by themselves, and the recording medium storing the program codes constitutes the present invention.

As a recording medium for supplying the program codes, for example, a flexible disk, a hard disk, an optical disk (CD, DVD, or the like), a magnetooptical disk (MO, or the like), a magnetic tape, a nonvolatile memory card, a ROM (Read Only Memory), or the like, can be used.

Obviously, the functions of the above embodiments are implemented, not only when the control unit executes the readout program codes, but also, when the OS (Operating System) running on the system or the apparatus, such as the computer, performs part of or all of actual processing based on the instructions of the program codes.

Obviously, the functions of the above embodiments are also implemented when the program codes read out from the recording medium are written in the memory of a function expansion board inserted into the computer or a function expansion unit connected to the computer, and the CPU of the function expansion board or function expansion unit performs part of or all of actual processing based on the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
    an acquisition unit that acquires an image having object regions;
    a detector that detects each object region from the image acquired by said acquisition unit;
    a luminance distribution calculator that calculates a plurality of luminance distribution information for respective object regions detected by said detector;
    a representative luminance value calculator that calculates a plurality of representative luminance values for respective object regions detected by said detector; and
    a determination unit that determines tone characteristics, which are used for tone compression, for respective object regions, wherein said determination unit determines the tone characteristic for a target object region based on a luminance distribution of the target object region and a difference between the representative luminance value of the target object region and the representative luminance value other than the target object region.

2. The apparatus according to claim 1, wherein said determination unit determines a gain amount to be commonly multiplied for respective object regions based on the representative luminance values for respective object regions calculated by said representative luminance value calculator and the plurality of luminance distribution information for respective object regions calculated by said luminance distribution calculator.

3. The apparatus according to claim 1, wherein said determination unit determines a tone curve for respective object regions based on the representative luminance values for respective object regions calculated by said representative luminance value calculator and the plurality of luminance distribution information for respective object regions calculated by said luminance distribution calculator.

4. The apparatus according to claim 3, wherein said determination unit adjusts a compression amount of the tone curve in accordance with a luminance level difference between the respective objects.

5. The apparatus according to claim 1, further comprising an exposure amount calculator configured to calculate an exposure amount for respective object regions at the time of image shooting based on the representative luminance values for respective object regions calculated by said representative luminance value calculator and the plurality of luminance distribution information for respective object regions calculated by said luminance distribution calculator.

6. The apparatus according to claim 1, wherein said determination unit determines tone characteristics for respective object regions in accordance with luminance distribution characteristics for respective object regions.

7. The apparatus according to claim 1, wherein said representative luminance value calculator calculates an average luminance value for respective object regions.

8. The apparatus according to claim 1, wherein the plurality of luminance distribution information for respective object regions is different from the plurality of representative luminance values for respective object regions.

9. An image processing method comprising:
    an acquisition step of acquiring an image having object regions;
    a detection step of detecting each object region from the image acquired in the acquisition step;
    a luminance distribution calculation step of calculating a plurality of luminance distribution information for respective object regions detected in the detection step;
    a representative luminance value calculation step of calculating a representative luminance value for each object region detected in the detection step; and
    a determination step of determining tone characteristics, which are used for tone compression, for respective object regions, based on a luminance distribution of the target object region and a difference between the representative luminance value of the target object region and the representative luminance value of the object region other than the target object region.

10. A non-transitory computer-readable recording medium recording a program for causing a computer to execute each step in an image processing method comprising:
    an acquisition step of acquiring an image having object regions;
    a detection step of detecting each object region from the image acquired in the acquisition step;
    a luminance distribution calculation step of calculating a plurality of luminance distribution information for respective object regions detected in the detection step;
    a representative luminance value calculation step of calculating a representative luminance value for each object region detected in the detection step; and
    a determination step of determining tone characteristics, which are used for tone compression, for respective object regions, based on a luminance distribution of the target object region and a difference between the representative luminance value of the target object region and the representative luminance value of the object region other than the target object region.

* * * * *